US000001325H

United States Statutory Invention Registration [19]

[11] Reg. Number: H1325

[43] Published: Jul. 5, 1994

Doering et al.

[54] ONE STAGE COAL GASIFICATION PROCESS

[75] Inventors: Egon L. Doering; Phillip E. Unger, both of Houston; Eugene Alsandor, Sugar Land, all of Tex.

[73] Assignee: Shell Oil Company, Houston, Tex.

[21] Appl. No.: 960,345

[22] Filed: Oct. 13, 1992

[51] Int. Cl.[5] ..... C10J 3/16

[52] U.S. Cl. ..... 48/197 R; 48/202; 48/206; 48/DIG. 2

[58] Field of Search ..... 48/197 R, 202, 203, 48/206, 210, DIG. 1, DIG. 2; 252/373

[56] References Cited

U.S. PATENT DOCUMENTS

| | | | |
|---|---|---|---|
| 3,963,407 | 6/1976 | Hess | 48/206 |
| 4,054,424 | 10/1977 | Stardling et al. | 48/DIG. 2 |
| 4,121,912 | 10/1978 | Borber et al. | 48/206 |
| 4,247,302 | 1/1981 | Woldy et al. | 48/192 R |
| 4,248,604 | 2/1981 | Woldy et al. | 48/197 R |
| 4,272,256 | 6/1981 | Mitsak | 48/203 |
| 4,424,065 | 1/1984 | Langloff et al. | 48/206 |
| 4,425,259 | 1/1984 | Langhoff et al. | 48/210 |
| 4,508,542 | 4/1985 | Langloff et al. | 48/DIG. 2 |
| 4,810,264 | 3/1989 | Devitz | 48/DIG. 2 |
| 4,838,898 | 6/1989 | Midglen et al. | 48/206 |
| 4,872,886 | 10/1989 | Henley et al. | 48/192 R |
| 4,897,090 | 1/1990 | Liu et al. | 48/206 |
| 4,936,871 | 6/1990 | Wilmer et al. | 48/206 |
| 4,936,873 | 6/1990 | Richard | 48/206 |
| 4,969,931 | 11/1990 | Wu et al. | 48/DIG. 2 |
| 5,066,476 | 11/1991 | Wetzel et al. | 48/192 R |
| 5,078,752 | 1/1992 | Mach et al. | 48/DIG. 2 |
| 5,112,366 | 5/1992 | Lui | 48/206 |
| 5,181,993 | 1/1993 | Weber | 48/DIG. 2 |

*Primary Examiner*—Robert L. Stoll
*Assistant Examiner*—Joseph D. Anthony

[57] ABSTRACT

An improved one stage, upflow process for coal gasification whereby a dry particulate carbonaceous material and an oxygen-containing gas are combusted in a vertical gasifier thereby converting the carbonaceous material (coal) into a hot gas. The hot, entrained flyslag gas is then contacted with a cooled, recycled gas in a quench zone, thus cooling the gaseous product stream and causing the molten slag particles to convert to non-sticky flyslag particles. The high level thermal energy from the flyslag-laden gaseous product stream is recovered in a fire tube heat exchanger and the flyslag particles from the gaseous product stream are separated by conventional means and recycled back to the gasifier. The product raw gas is further treated for use in a gas turbine to produce electricity.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

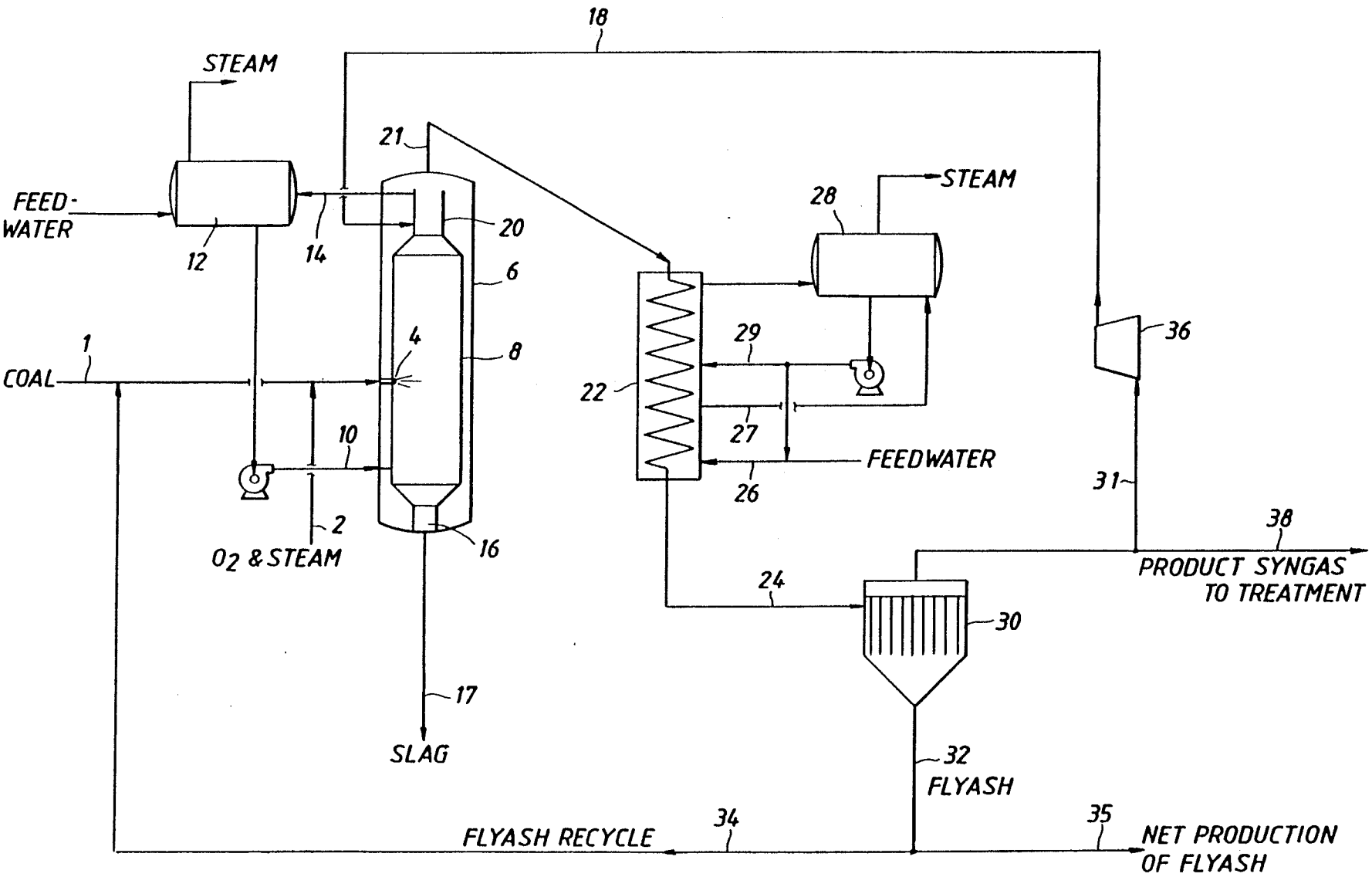
PRODUCT SYNGAS TO TREATMENT
38
36
31
NET PRODUCTION OF FLYASH
35
STEAM
FEEDWATER
30
32
FLYASH
28
29
27
26
24
34
22
18
FLYASH RECYCLE
20
6
8
16
17
SLAG
21
4
10
2
14
O2 & STEAM
STEAM
12
1
FEED-WATER
COAL

ONE STAGE COAL GASIFICATION PROCESS

BACKGROUND OF THE INVENTION

1. Field of the Invention

The present invention pertains to an improved one stage process for the gasification of a carbonaceous material such as coal.

2. Description of Related Art

One of the basic processes developed for the gasification of a carbonaceous material, such as coal, is entrained bed gasification. Entrained bed gasifiers partially oxidize the carbonaceous material generating a product gas at high temperature. Thermal energy must also be recovered in order to effectively utilize the heating value of the coal. The hot product gases produced from entrained bed gasification have such high temperatures that they must be cooled or quenched prior to heat recovery in conventional heat exchangers. A further problem with entrainment gasifiers is that sticky slag particles are produced which are entrained in the hot product gases and, if not removed, tend to foul the downstream heat transfer surfaces.

U.S. Pat. Nos. 4,247,302 and 4,248,604 disclose gasification processes which utilize downflow partial oxidation reactors equipped with a diversion chamber followed by a solids separation zone to substantially remove entrained solids from the gas stream prior to passing the gas stream through one or more fire tube gas coolers.

U.S. Pat. No. 5,066,476 discloses a method of producing hydrogen rich gas which can be used for synthesis of ammonia or for hydrating of organic compounds. A hot gas from a gasifier is cooled first in a waste heat boiler, and then further cooled by adding converted circulating gas in a quenching zone. This process has the disadvantage of first cooling the hot gas containing entrained molten slag in a waste heat boiler which causes a problem with fouling of the heat transfer surfaces of the waste heat boiler and quench zone in the process. Also, this process requires expensive apparatus.

U.S. Pat. No. 4,872,886 discloses an entrained bed gasification process which attempts to solve the excessive temperature and fouling problems by use of a two-stage gasification process which allows the use of a high temperature heat recovery system including a fire tube boiler. In the first stage, the carbonaceous material, in the form of a slurry of carbonaceous material with a liquid carrier such as water, is mixed with an oxygen-containing gas and combusted. The partial combustion products are steam, slag, char and gaseous combustion products. In the second stage, a second increment of carbonaceous material in slurry form is injected into a second, unfired stage of the reactor where predominantly endothermic reactions occur. This serves to quench the hot gaseous combustion products from the first stage of the reactor and produces a nonfouling gaseous product stream that can be passed to a high temperature heat recovery system including a fire tube boiler. This patent teaches that it is essential to employ an unfired, second-stage reactor in order to avoid fouling or plugging of the fire tube boiler. Example 5 of the patent illustrates that a fire tube boiler will be plugged to inoperability in a short period of time if an unfired, second-stage reactor is not employed. Since both two-stage reactors and downflow reactors with diversion chambers are more complex and expensive than single-stage upflow reactors, it would be highly desirable to have a one stage, upflow gasification process which produces a gaseous product which could be passed directly into a high-temperature heat recovery system such as a fire tube heat exchanger without the substantial removal of entrained solids. The present invention concerns such a highly efficient one stage gasification process.

SUMMARY OF THE INVENTION

The present invention provides a non-catalytic, one stage, upflow process for the gasification of carbonaceous material, which comprises the steps of:

a) partially combusting in a fired, vertical, upflow slagging gasifier a stream comprising an oxygen-containing gas and a dry particulate, carbonaceous material at high temperature and forming a molten slag stream and a gaseous product stream having entrained therein sticky, molten slag particles;
b) separating said molten slag stream from the gaseous product stream;
c) quenching the gaseous product stream in a quench zone with an inert gas stream, thereby cooling the gaseous product stream and converting the molten slag particles from the gaseous product stream to flyslag particles (flyash);
d) recovering thermal energy from a flyslag-laden gaseous product stream in a fire tube heat exchanger without substantial removal of flyslag particles; and
e) separating the flyslag particles from the flyslag-laden gaseous product stream.

BRIEF DESCRIPTION OF THE DRAWING

The FIGURE is a process flow diagram representing an improved one stage coal gasification process of the invention.

DETAILED DESCRIPTION OF THE INVENTION

The present invention is process provides a clean, efficient, noncatalytic, one stage, upflow process for converting carbonaceous materials such as coal into a clean synthesis gas product. The process of the invention features the use of a single stage, upflow reactor, a dry quench of the product gases and a fire tube heat exchanger for recovery of at least part of the thermal energy in the product gases. An important aspect of the process is that the recovery of thermal energy in the fire tube heat exchanger takes place prior to the removal of entrained solids.

The process of the present invention uses a wide variety of coals ranging from bituminous to lignite as well as other carbonaceous materials such as coke from coal, coal char, particulate carbon, and petroleum coke. The process of the invention comprises the partial combustion of a carbonaceous material such as dry particulate coal in combination with oxygen and, if necessary, steam to burners of a gasifier. The gasifier used is a vertical, oblong vessel consisting of an outer pressure vessel and an inner, water-cooled membrane wall. The membrane wall encloses the gasification zone from which two outlets are provided. One opening at the bottom of the gasifier is used for the removal of slag. The other opening usually at the top of the gasifier allows hot, raw gas to exit from the gasifier. The gasifier wall temperature is controlled by circulating water through the membrane wall.

A majority of the mineral content of the feed coal leaves the gasification zone in the form of molten slag. The high gasifier temperature which produces a flame temperature from about 1648° C. (about 3000° F.) to about 1926° C. (about 3500° F.) ensures that the molten slag flows freely down the inside of the water-cooled membrane wall into a water-filled compartment at the bottom of the gasifier where the slag is converted to a vitreous solid. Flux may be added to the coal feed to promote the necessary viscosity for the slag flow out of the bottom of the gasifier if the ash viscosity of a particular coal is insufficient. The hot, raw product gas has a temperature of about 1371° C. (about 2500° F. ) to about 1,704° C. (about 3100° F. ) leaving the gasification zone from an opening at the top of the gasifier, it is quenched to a lower temperature with a cooler gas; preferably particulate-free raw gas recycled by a simple, single-stage compressor as opposed to a complicated multi-stage compressor. Any entrained, molten slag is converted to a hardened solid material , called "flyslag or flyash," prior to entering a fire tube heat exchanger. Thus, any incidence of sticky slag adhering to the surface of the fire tube heat exchanger is avoided. Nitrogen which is available from the air separation unit may also be used for quench. Steam or water may be utilized for quench and in this case some water-gas shifting of the raw gas is expected. The quenched, raw gas typically has a temperature of from about 899° C. (about 1650° F. ) to about 1038° C. (about 1900° F. ). Also, the raw gas has a sufficient quantity of entrained flyslag to provide a site for foulants such as desublimed sodium chloride and potassium chloride on which to adhere. The fire tube heat exchanger or boiler is a closed vessel consisting of a shell having tubes located within the shell. Suitable fire tube heat exchanger devices include those described in U.S. Pat. Nos. 4,700,773, 4,727,933, 5,088,551, 4,813,382 and 5,035,283 incorporated herein by reference. The quenched, raw gas enters the fire tube heat exchanger for further cooling to a temperature in the range of about 232° C. (about 450° F. ) to about 370° C. (about 700° F.). The high velocity of the solids-laden gas stream entering the fire tube assures that the foulants do not adhere to the wall of the fire tubes. The fire tube heat exchanger recovers high levels of heat from the product gas through the generation of high-pressure steam. Water enters the shell into the low temperature section or economizer and is heated and passes to a collector or steam drum. Heated water from a steam drum passes to the evaporator section of the fire tube heat exchanger. The water is then partially vaporized and passes back to the steam drum for subsequent use in the process. The high gas velocity mentioned above provides sufficient wall turbulence to realize increased heat transfer coefficients. These higher-heat transfer coefficients insure lower capital cost exchange and lower maintenance costs than the conventional water wall syngas cooler used with some entrained-bed gasifiers.

The bulk of the flyash contained in the quenched, raw gas leaves the fire tube heat exchanger and is removed from the gas using commercially demonstrated filter devices such as bag filters, cyclones, or ceramic candles (filters). Suitable filter devices include those described in U.S. Pat. Nos. 4,248,604, 4,247,302, 4,810,264, 4,482,363, and 4,121,912. The preferred method of removing the flyslag in the present invention is by ceramic candles or ceramic filters. Flyslag is recycled to the gasifier to convert any carbon on the flyslag to desirable gaseous products in the gasifier. Recycle of the flyslag to the gasifier further promotes conversion of its mineral content to slag and increases the overall production of slag.

DETAILED DESCRIPTION OF THE DRAWING

The process of the present invention will now be described by referring to the FIGURE.

Pulverized coal is fed via line (1) to burners (4) of a gasifier (6) simultaneously with oxygen and steam via line (2). Gasifier (6) is defined by a surrounding membrane wall structure (8) enclosed in a pressure vessel. The combustion of the pulverized coal and oxygen produces a flame temperature of from about 1648° C. (about 3000° F.) to about 1926° C. (about 3500° F.). Boiler feed water via line (10) in tubes of membrane wall structure (8) cools the membrane wall. Some steam and heated water are passed to a first steam collector or drum (12) via line (14) for further heating. The mineral content of the coal feed forms a molten slag that flows down the water-cooled membrane wall (8) into a water-filled compartment (16) where it is converted to a vitreous solid and subsequently is removed via line (17) to a collecting vessel (not shown).

Hot, raw gas is quenched with a recycled gas via line (18) in a quench zone (20). The quenched, raw gas (21) leaves the quench zone (20) and passes to fire tube heat exchanger (22) by way of a transfer duct not shown. The quenched, raw gas (21) is further cooled through the fire tube heat exchanger (22).

The fire tube heat exchanger (22) is comprised of an evaporator section and economizer section. Boiler feed water enters the shell side of the economizer section of the fire tube heat exchanger (22) via line (26) and is heated. Boiler feed water passes via line (27) to a second steam collector or vessel drum (28). Heated water from the second steam collector or vessel drum (28) passes via line (29) to the shell side of the evaporator section of the fire tube heat exchanger (22) and is partially vaporized, and passes back to the steam collector or vessel drum (28).

The entrained flyslag in the quenched, raw gas (24) is removed by ceramic filters (30) and the flyslag (flyash) (32) can be recycled back, (flyash recycle 34)) to the gasifier via the coal feeding system (not shown) or disposed of (net production of flyash) (35) out of the system. A portion of the quenched, raw gas (31) is recycled back through the quench gas compressor (36) to be used as recycled gas for cooling the hot, raw, entrained gas. The product raw gas (38) (quenched, raw gas without the flyslag) will be further processed to remove sulfides and other contaminants for subsequent use as a fuel gas in combustion turbines or as a chemical feedstock.

The invention will be described by the following illustrative embodiment which is provided for illustrative purposes and is not to be construed as limiting the invention.

ILLUSTRATIVE EMBODIMENT

This embodiment shows the conditions and results of the process with respect to flow rates of the gases and solids, temperatures and pressures.

The coal is first finely pulverized to a powder and simultaneously dried to less than 2 to 5% weight moisture in a pulverizer. Limestone and flyash containing unconverted carbon are added to the mill to insure mixing of the ash materials fed to the gasifier (6).

This mixture is pressurized to a pressure level of 28 bara (a bara is equal to 14.5 psia), above the gasifier's (6) operating pressure, in a lockhopper system. The coal/-limestone/flyash mixture is transported to the gasifier (6) with nitrogen as a carrier. The coal mixture plus the carrier at a rate of 21.3 kg/sec is introduced into the gasifier with set(s) of burners (4) where the oxygen at a rate of (15.7 kg/sec) and steam at a rate of (2.6 kg/sec) are intimately contacted with the coal mixture to provide partial combustion conditions at temperatures above 1650° C. and pressures of 25 to 40 bara. The reaction takes place within an inner, water-cooled membrane wall (8) enclosed by a pressure vessel.

The ash and mineral content of the coal changes to a molten slag where part of the molten slag at 1650° C. freezes on the water-cooled membrane wall (8) to form a protective barrier for the metal and the rest of the molten slag then flows freely at a rate of 2.0 kg/sec to a small opening at the bottom of the gasifier. The molten slag passes through this opening and falls into a water bath where it is transformed into a vitreous solid granular or glass-like material. The slag is further cooled and depressurized out of the gasifier for subsequent by-product use or for disposal. The water in the membrane wall (8) of the gasifier (6) is circulated and partially vaporized to provide steam at a rate of 2.67 kg/sec having a temperature of 254° C. and a pressure of 42.4 bara for utility steam use.

The gaseous products of partial combustion consist primarily of carbon monoxide and hydrogen and contains no tars, phenols or other organics. Entrained slag and the raw gas at a rate of 39.1 kg/sec leaves the gasifier (6) at an opening at the top of the gasifier. This mixture is at 1493° C. and is quickly quenched with a cooler gas of 205° C. at a rate of 36.5 kg/sec. The quench gas serves to reduce the gas/slag mixture temperature quickly to 900° C. and so convert the entrained slag to a powdery flyash at a rate of 1.6 kg/sec which will not have properties to foul the subsequent heat exchange equipment.

The dust-laden quenched raw gas enters a fire tube heat exchanger (22) at high velocity to ensure Unproved heat transfer, and exchanges heat with boiler feed water (10). The gas is cooled from 900° C. to 230° C. while generating at a rate of 45.7 kg/sec saturated steam having a temperature of 325° C. and a pressure of 121 bara in the exchanger (22). This saturated steam is subsequently superheated for power generation or utility use in downstream equipment. Little to no fouling occurs because of the characteristics of the dust-laden gas and the design of the fire tube exchanger permitting operation of the process for extended periods of time.

The cooled dust-laden gas enters a separator at 230° C. to remove the dust from the raw gas. This is accomplished in a ceramic candle filter vessel (30) where at a rate of 3.6 kg/sec flyash is separated from the raw gas and subsequently stripped of gas, depressured and sent to intermediate storage. Cooled, stripped flyash (32) at a rate of 3.2 kg/sec is recycled to the gasifier (6) for subsequent conversion of its carbon content and melting of the flyash to slag. Flyash (35) at a rate of 0.2 kg/sec is produced for a by-product utilization or disposal.

The cooled, dust-free gas is then separated at a rate of 80.4 kg/sec for recycle via a compressor (36) to the gasifier exit for use as quench gas medium. The recycle gas compressor (36) increases the pressure of the quench gas from 22.4 bara to 28.4 bara for return to the gasifier quench section (20). The net raw gas (38) at a rate of 37.4 kg/sec is processed further downstream in the plant for contaminant removal prior to its use as fuel for a gas turbine, chemical plant feedstock or hydrogen production.

What is claimed is:

1. A non-catalytic, one stage, upflow process for gasification of a carbonaceous material, wherein the process consisting essentially of the steps of:
   a) partially combusting in a fired, vertical slagging gasifier a stream comprising an oxygen-containing gas and a dry particulate carbonaceous material at high temperatures and forming a molten slag stream and a gaseous product stream having entrained therein sticky, molten slag particles;
   b) separating said molten slag stream from the gaseous stream;
   c) quenching the gaseous product stream in a quench zone with an inert gas thereby cooling the gaseous product stream and the entrained molten slag particles in the gaseous product stream to flyslag particles;
   d) passing said gaseous product stream and entrained flyslag particles directly from the quenching step (c) to the thermal energy recovery step (e), without further processing and without flyslag particle removal;
   e) recovering high level thermal energy from a flyslag-laden gaseous product stream in a fire tube heat exchanger; and
   f) separating the flyslag particles from the gaseous product stream of step (e).

2. The process of claim 1 wherein the carbonaceous material is coal.

3. The process of claim 1 wherein the oxygen-containing gas is air or oxygen-enriched air.

4. The process of claim 1 wherein the inert gas is a recycled gaseous product from the process.

5. The process of claim 4 wherein part of the quenched, raw gas from step (e) is recycled to the gasifier exit by a compressor.

6. The process of claim 4, wherein the flyslag particles are separated from the gaseous product stream using ceramic candle filters.

7. The process of claim 6 wherein most of the flyslag particles from step (e) are recycled back to the gasifier.

8. The process of claim 1 wherein step (a) is performed at a temperature of from about 1371° C. (about 2500° F.) to about 1926° C. (about 3500° F.) pressure of from about 300 psia (about 20.7 bara) to about 500 psia (about 34.5 bara).

9. The process of claim 8 wherein the gaseous product mixture is quenched in step (b) to a temperature of from about 899° C. (about 1650° F.) to about 1038° C. (about 1900° F.).

10. The process of claim 9 wherein the gaseous product stream is cooled to a temperature of from about 899° C. (about 1650° F.) to about 232° C. (about 450° F.) in the fire tube heat exchanger.

* * * * *